(12) United States Patent
Whitaker

(10) Patent No.: US 9,744,752 B2
(45) Date of Patent: Aug. 29, 2017

(54) INFLATABLE PANEL AND METHOD OF MANUFACTURING SAME

(71) Applicant: Inflatek Innovations, LLC, Barrington, IL (US)

(72) Inventor: Mark A. Whitaker, Barrington, IL (US)

(73) Assignee: INFLATEK INNOVATIONS, LLC, Barrington, IL (US)

( * ) Notice: Subject to any disclaimer, the term of this patent is extended or adjusted under 35 U.S.C. 154(b) by 135 days.

(21) Appl. No.: 14/665,169

(22) Filed: Mar. 23, 2015

(65) Prior Publication Data

US 2015/0190990 A1 Jul. 9, 2015

Related U.S. Application Data

(63) Continuation-in-part of application No. 13/749,349, filed on Jan. 24, 2013, now abandoned.

(60) Provisional application No. 61/589,979, filed on Jan. 24, 2012.

(51) Int. Cl.
| | |
|---|---|
| *B32B 37/06* | (2006.01) |
| *B32B 37/00* | (2006.01) |
| *B32B 37/10* | (2006.01) |
| *B32B 37/12* | (2006.01) |
| *B32B 37/18* | (2006.01) |
| *B31D 5/00* | (2017.01) |
| *B65D 81/05* | (2006.01) |
| *B32B 38/00* | (2006.01) |

(52) U.S. Cl.
CPC ........ *B32B 37/0076* (2013.01); *B31D 5/0073* (2013.01); *B32B 37/06* (2013.01); *B32B 37/10* (2013.01); *B32B 37/12* (2013.01); *B32B 37/18* (2013.01); *B65D 81/052* (2013.01); *B31D 2205/0023* (2013.01); *B32B 2038/0052* (2013.01); *B32B 2419/00* (2013.01); *B32B 2553/02* (2013.01); *Y10T 156/10* (2015.01); *Y10T 428/24149* (2015.01)

(58) Field of Classification Search
CPC .................................................. B32B 37/0076
See application file for complete search history.

(56) References Cited

U.S. PATENT DOCUMENTS

| | | |
|---|---|---|
| 1,984,653 A | 12/1934 | Palmer et al. |
| 2,288,170 A | 6/1942 | Moeller |
| 2,604,641 A | 7/1952 | Reed |
| (Continued) | | |

OTHER PUBLICATIONS

European Search Report issued by the European Patent Office in EP Application No. 14000219.7-1308, mailed May 12, 2014.

*Primary Examiner* — Jeff Aftergut
(74) *Attorney, Agent, or Firm* — Greer Burns & Crain, Ltd.

(57) ABSTRACT

A method of making an inflatable panel that includes the steps of: superimposing a second layer of a material of low gas permeability upon a first layer of a material of low gas permeability; creating a plurality of first elongated seals by intermittently sealing together the first and second layers, thereby defining a plurality of first tubes between adjacent pairs of the first elongated seals. The method also includes sealing rear ends of the first tubes; inflating the first tubes from front ends thereof with a gas; and then sealing the front ends of the first tubes, such that the gas within each of said tubes is prevented from flowing between the first tubes.

16 Claims, 24 Drawing Sheets

(56) References Cited

U.S. PATENT DOCUMENTS

| | | | |
|---|---|---|---|
| 3,030,640 A * | 4/1962 | Gosman | A47C 27/081 |
| | | | 441/127 |
| 3,556,186 A | 1/1971 | Besthorne | |
| 3,619,340 A | 11/1971 | Jones | |
| 3,648,306 A | 3/1972 | Auerbach | |
| 3,730,240 A | 5/1973 | Presnick | |
| 3,817,803 A * | 6/1974 | Horsky | B29C 65/18 |
| | | | 156/145 |
| 3,868,285 A * | 2/1975 | Troy | B29C 66/1122 |
| | | | 156/147 |
| 3,904,465 A | 9/1975 | Haase et al. | |
| 4,044,867 A | 8/1977 | Fisher | |
| 4,091,482 A | 5/1978 | Malcolm | |
| 4,164,970 A | 8/1979 | Jordan | |
| 4,262,045 A | 4/1981 | Cheng et al. | |
| 4,284,674 A | 8/1981 | Sheptak | |
| 4,346,132 A | 8/1982 | Cheng et al. | |
| 4,346,432 A | 8/1982 | Gurr | |
| 4,533,583 A | 8/1985 | May | |
| 4,569,082 A | 2/1986 | Ainsworth et al. | |
| 4,574,953 A | 3/1986 | Garbuzov | |
| 4,618,517 A | 10/1986 | Simko, Jr. | |
| 4,636,416 A | 1/1987 | Kratel et al. | |
| 4,669,632 A | 6/1987 | Kawasaki et al. | |
| 5,000,382 A | 3/1991 | Stedman | |
| 5,080,146 A | 1/1992 | Arasteh | |
| 5,230,941 A | 7/1993 | Hollander et al. | |
| 5,263,587 A | 11/1993 | Elkin et al. | |
| 5,270,092 A | 12/1993 | Griffith et al. | |
| 5,314,250 A | 5/1994 | Lee | |
| 5,427,830 A | 6/1995 | Pharo | |
| 5,469,966 A | 11/1995 | Boyer | |
| 5,489,464 A * | 2/1996 | Bjorck | B29C 66/004 |
| | | | 156/145 |
| 5,535,888 A | 7/1996 | De Luca | |
| 5,588,532 A | 12/1996 | Pharo | |
| 5,706,969 A | 1/1998 | Yamada et al. | |
| 5,727,270 A | 3/1998 | Cope et al. | |
| 5,826,723 A | 10/1998 | Jaszai | |
| 5,937,595 A | 8/1999 | Miller | |
| 6,015,601 A * | 1/2000 | Garcia | A63H 27/10 |
| | | | 137/223 |
| 6,176,613 B1 | 1/2001 | Chen | |
| 6,206,075 B1 | 3/2001 | Prince et al. | |
| 6,266,926 B1 | 7/2001 | Figge et al. | |
| 6,283,296 B1 | 9/2001 | Newman | |
| 6,513,974 B2 | 2/2003 | Malone et al. | |
| 6,520,333 B1 | 2/2003 | Tschantz | |
| 6,629,777 B2 | 10/2003 | Tanaka et al. | |
| 6,755,568 B2 | 6/2004 | Malone et al. | |
| 7,169,459 B2 | 1/2007 | Lichodziejewski et al. | |
| 7,410,057 B2 | 8/2008 | Yoshifusa | |
| 7,464,506 B2 | 12/2008 | Atkinson | |
| 7,674,512 B2 | 3/2010 | Marson et al. | |
| 2002/0081041 A1 | 6/2002 | Malone et al. | |

\* cited by examiner

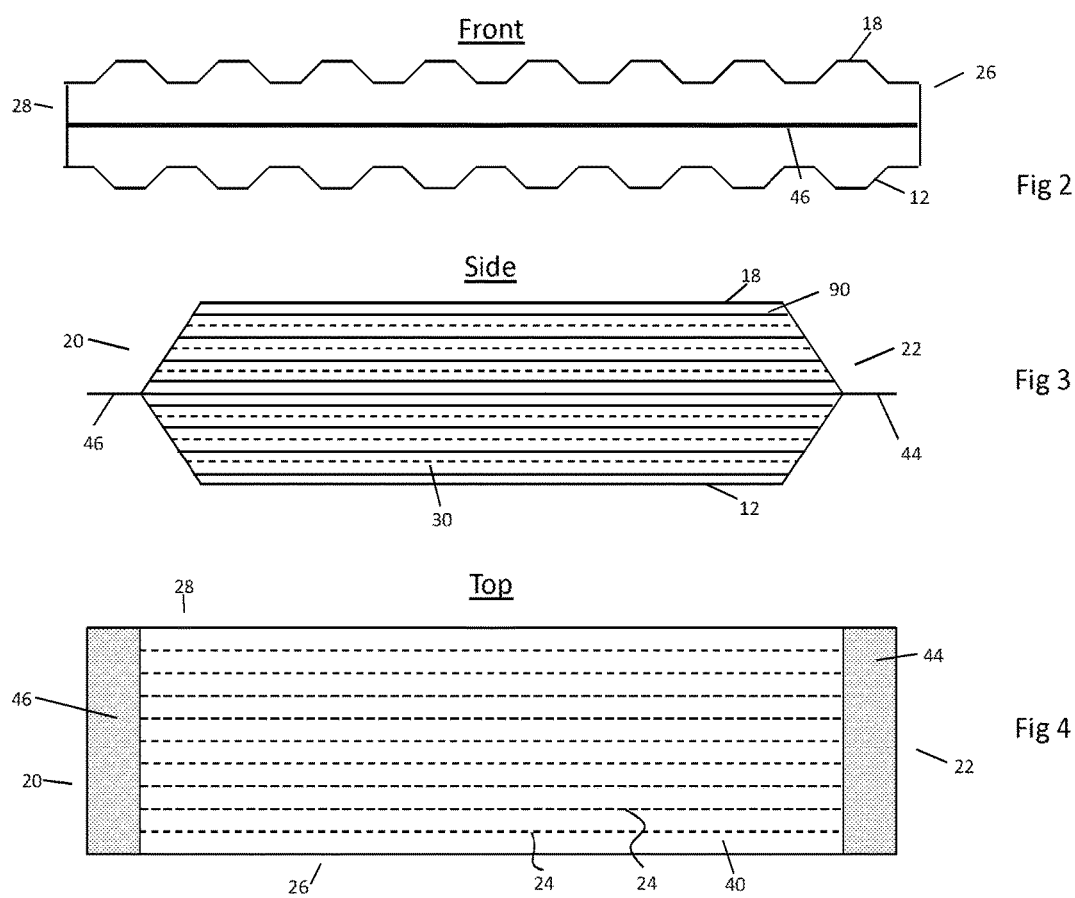

Fig. 5
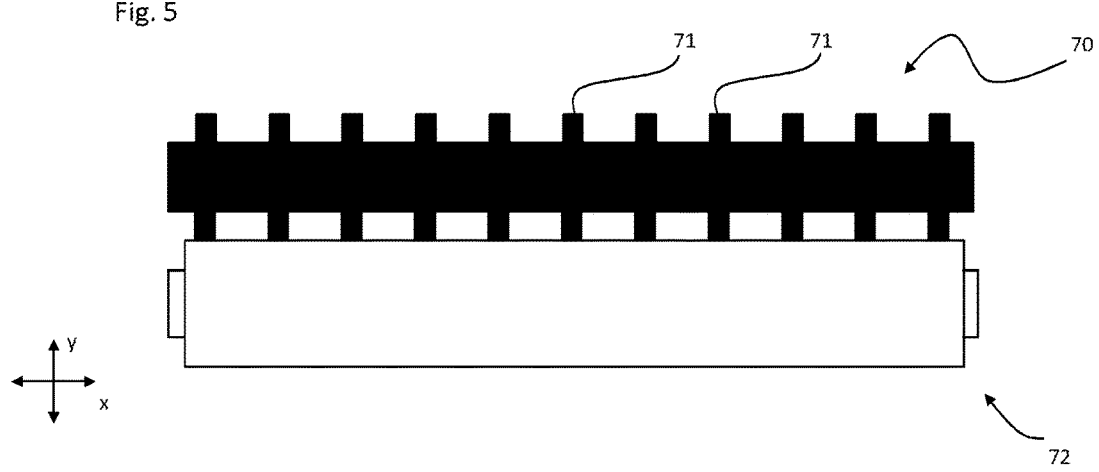
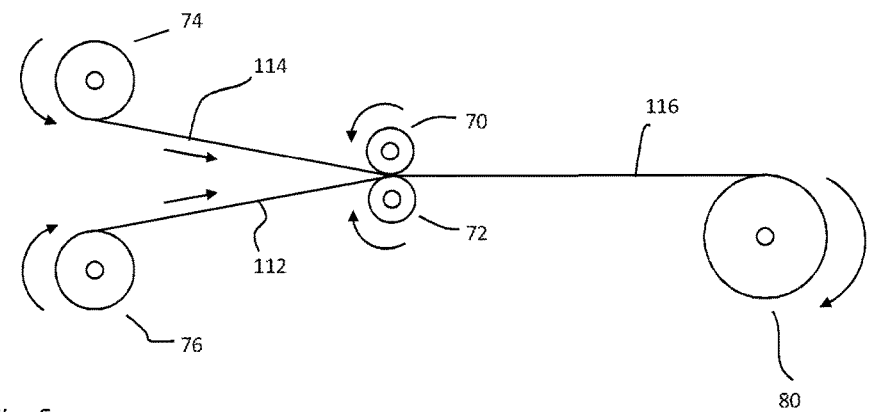
Fig. 6

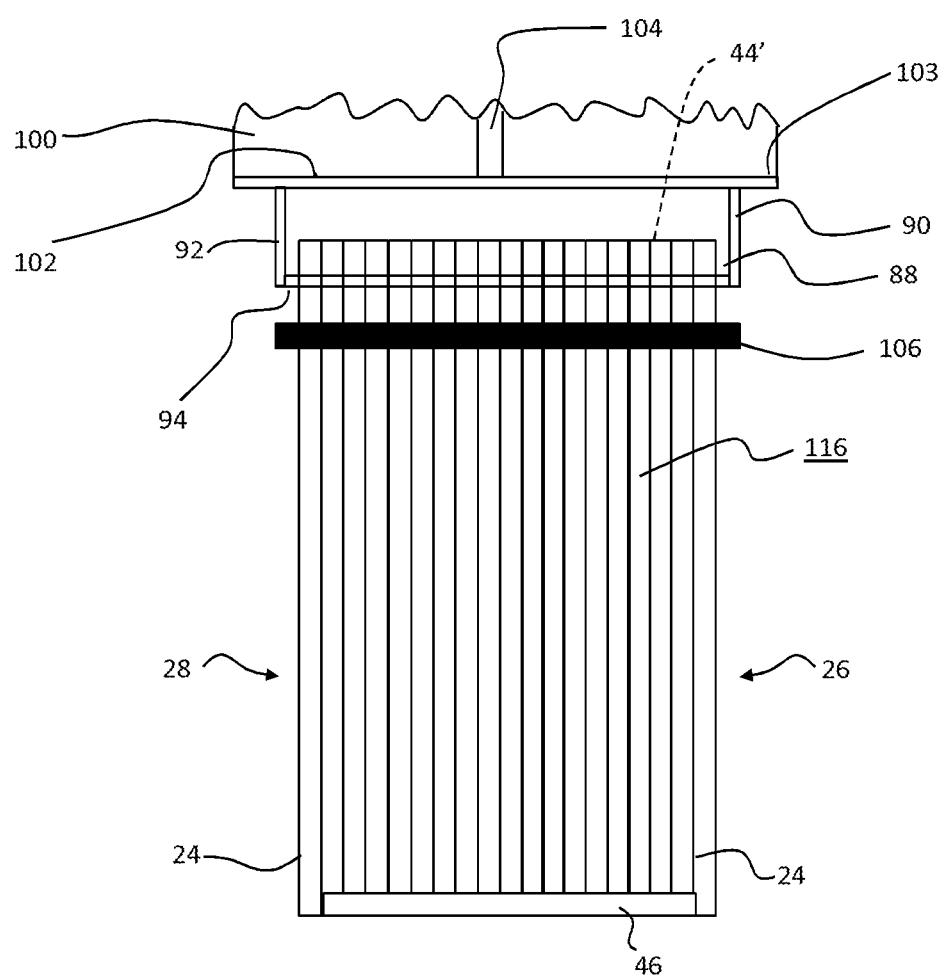

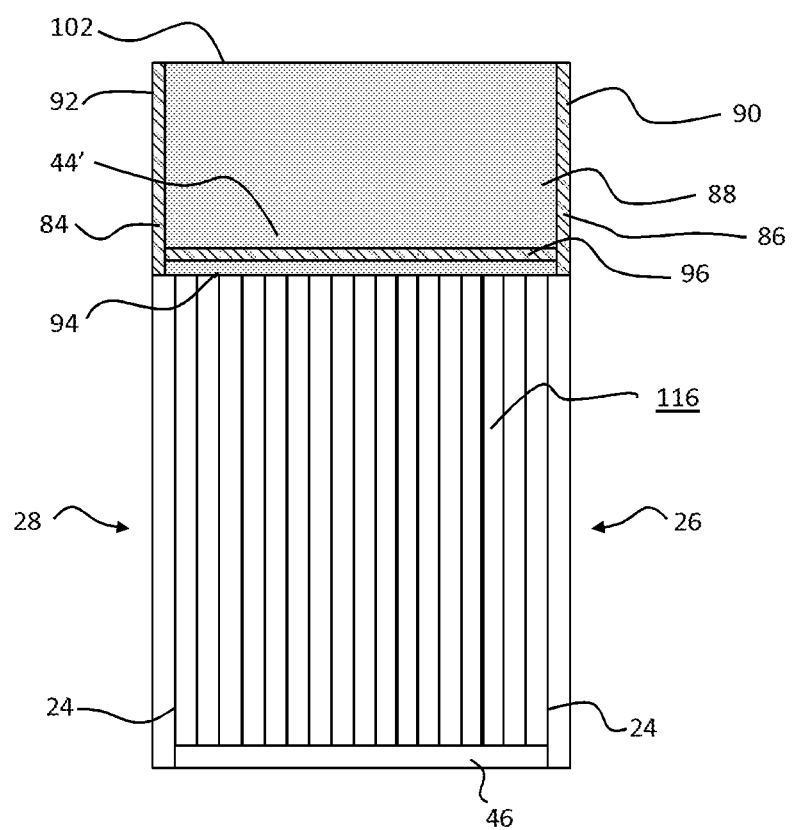

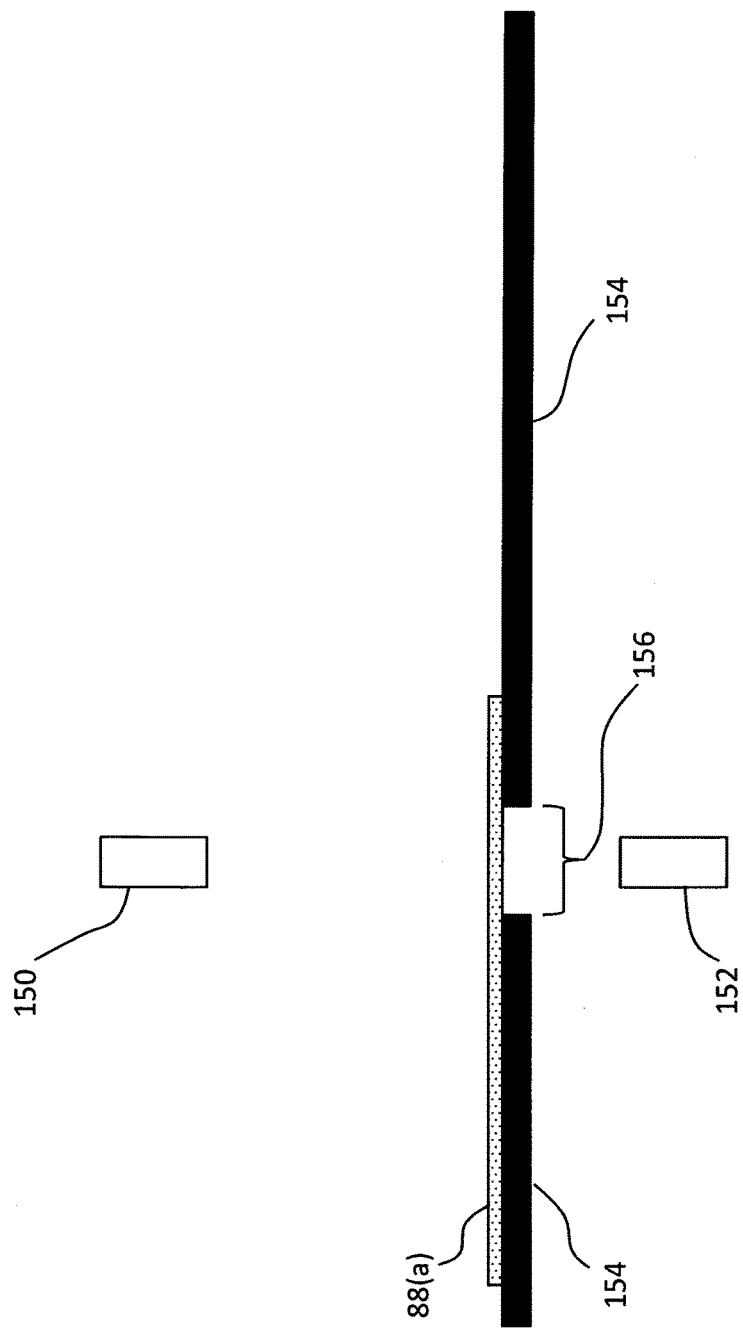

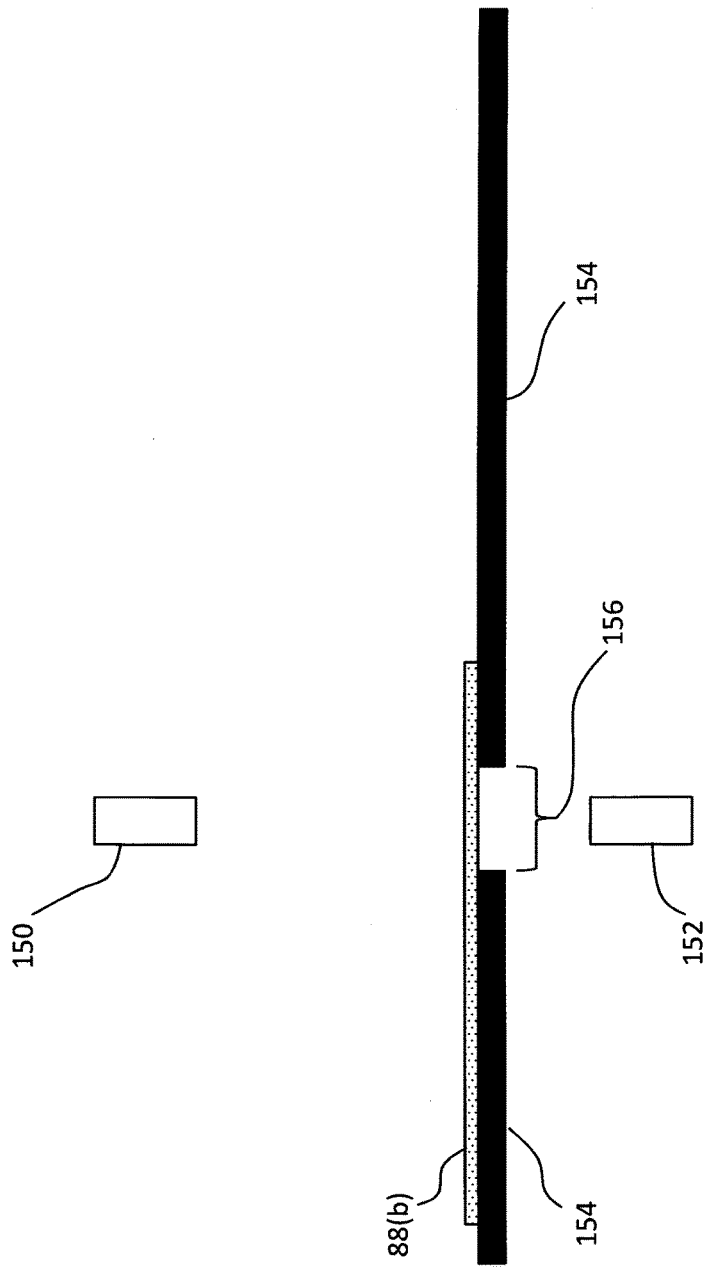

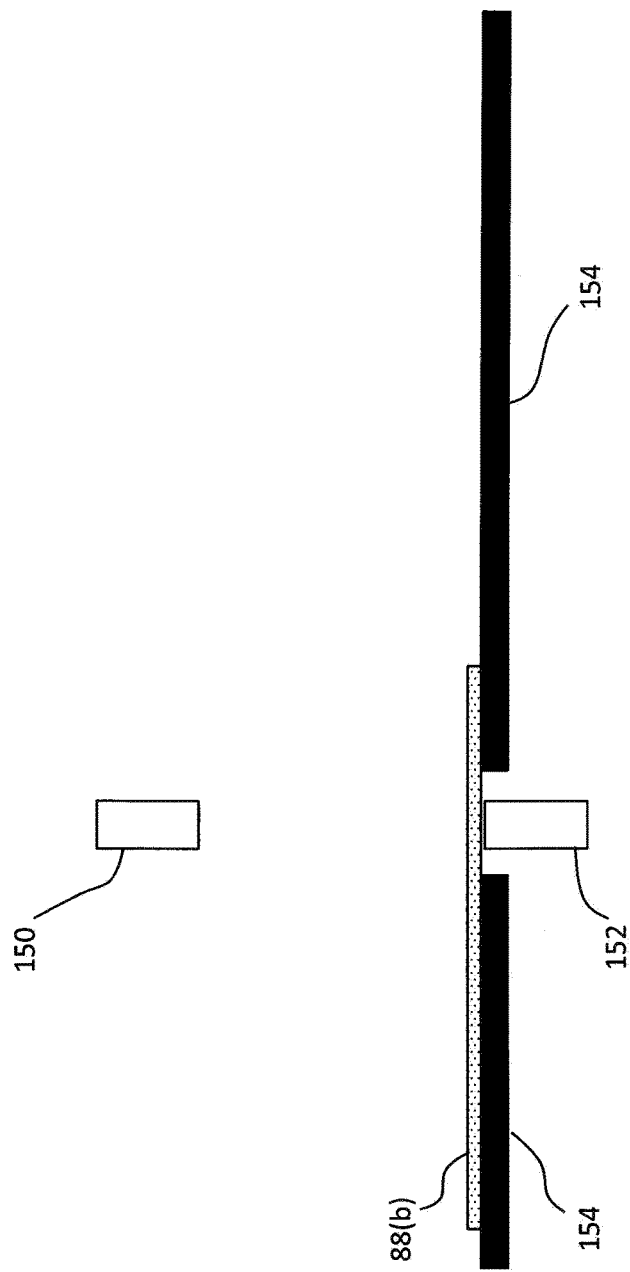

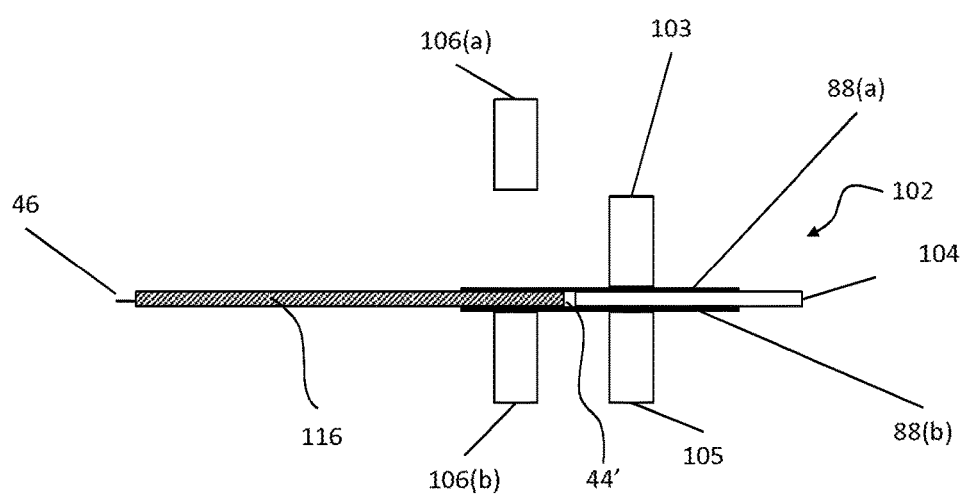

INFLATABLE PANEL AND METHOD OF MANUFACTURING SAME

The present utility application is a Continuation-in-Part (CIP) application of U.S. application Ser. No. 13/749,349, filed Jan. 24, 2013, which claims priority to U.S. Provisional Patent Application No. 61/589,979, which was filed on Jan. 24, 2012, both of which are hereby incorporated by reference in their entirety.

This application is directed to a method of making an inflatable panel that includes the steps of: superimposing a second layer of a material of low gas permeability upon a first layer of a material of low gas permeability; creating a plurality of first elongated seals by intermittently sealing together the first and second layers, thereby defining a plurality of first tubes between adjacent pairs of the first elongated seals. The method also includes sealing rear ends of the first tubes; inflating the first tubes from front ends thereof with a gas; and then sealing the front ends of the first tubes, such that the gas within each of said tubes is prevented from flowing between the first tubes.

This application is also directed to an inflatable panel, which is preferably gas filled, and which may function as an insulator and/or as a cushion. The panel described herein may be used to insulate a building structure, food, medicines, etc. When used to insulate food, medicines or other goods, it may be used within a package of any known type (such as a box, envelope, etc.) or the panel may be manufactured in such a configuration that it forms the package.

The panel described herein may be also used to cushion or protect goods, for example, during shipment as well as during storage. The panel described herein has various benefits including the fact that it may be stored in rolled-up and/or un-inflated form, cut to a desired length and inflated "on location" at the time of intended use. Another benefit of the panel described herein is that if part of the panel should be punctured or otherwise damaged, it will not lose all of its insulation or cushioning qualities.

The present application also includes various other methods of manufacturing such panels.

BRIEF DESCRIPTION OF THE SEVERAL VIEWS OF THE DRAWINGS

Preferred embodiments of the present invention are described herein with reference to the drawings wherein:

FIG. 2 is a front view of the panel of FIG. 1 after being inflated and sealed;

FIG. 3 is a side view of the panel of FIG. 1 after being inflated and sealed;

FIG. 4 is a top view of the panel of FIG. 1 after being inflated and sealed;

FIG. 5 is a schematic front view of a pair of rollers, which can be utilized to make heat seals along each of the layers of the panel;

FIG. 6 is a schematic side view of one process for creating a laminate for use in a panel;

FIG. 7(A) is a schematic top view of one method of inflating the tubes of the panel;

FIG. 7(B) is a schematic top view of a panel of an alternate configuration from that depicted in FIG. 7(A);

FIGS. 8(A)-8(H) are schematic side views of a process and machine for attaching the sheets (inflation tabs) to the laminate;

FIGS. 9(A)-9(F) are schematic side views of a process and machine for inflating the tubes and for sealing the ends of the tubes of the laminate, thereby creating an inflated panel;

DETAILED DESCRIPTION

Figure 1:
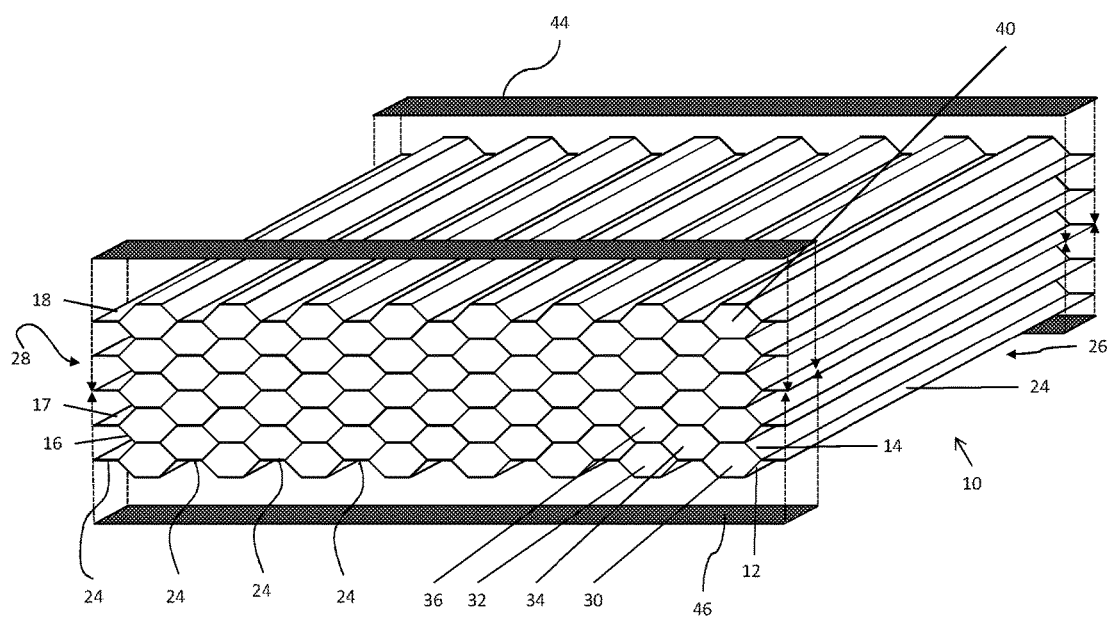
FIG. 1 is an illustrative, expanded view of one embodiment of the panel.

The various objects and advantages of the panel and its method of formation and use will be better understood upon considering the following detailed description taken in conjunction with the drawings.

In the following detailed description, all dimensions, shapes and configurations are for explanatory purposes only, and are to be considered non-limiting.

With reference to the drawings (such as FIG. 1), the panel 10 is illustrated as being formed of a plurality of layers (12, 14, 16, 17, . . . 18), which are preferably generally rectangular in shape, when considered in plan view. However, it also contemplated that other shapes may be used instead. In this example, ten layers are shown, although for clarity and ease of understanding of the drawings, only five of the ten layers are provided with reference numerals (12, 14, 16, 17, . . . 18). In this embodiment, the layers are preferably aligned vertically. Each of the layers could be made of any desired thin, flexible material that has low air permeability (or low inflation gas permeability). For example, each sheet could be made of thin films of any of the following materials, depending upon the desired attributes: polyester, metalized polyester, polyethylene, metalized polypropylene, polypropylene, etc. Further, the thickness of each sheet could be any desired standard thickness, depending upon the desired qualities, such as any standard thicknesses between 0.001 inch and 0.004 inch. Of course, all of the layers need not be made of the same material. For example, the materials of each particular layer could be chosen for the desired properties of that particular layer, such as by having the two outermost layers be more puncture resistant than the interior layers, or by having the two outermost layers of a reflective material to reduce heat transfer through radiation.

Adjacent layers, such as layers 12 and 14, layers 16 and 17, etc., are sealed together at spaced intervals along their entire length from front 20 to back 22. The elongated seal may be a heat seal, adhesive seal or any other form of seal that can create a continuous, hermetic seal in the desired area. One of the features of such a seal is that it prevents air, or other gas, from passing from one side of it to the other. For example, in one preferred embodiment, the seal 24 is a series of one-eighth inch wide elongated heat seals 24 that are spaced apart from each other by one-half inch, as shown in FIG. 1 (wherein the sum of the width of upper three segments of the hexagon is one-half inch). The preferred range of the width of the seal is between 1/16 of an inch to 1/4 of an inch, and the preferred spacing is between 1/4 inch and 2 inches, but more preferably, the spacing is between 1/2 and one inch. Further, in an embodiment with spacing between seals of 1/2 inch, the height of each tube is about 0.325 inches. Of course, such height is dependent upon the spacing between seals (with greater spacing allowing for greater height), and it is unlikely that all tubes will be of a uniform height. Additionally, as noted above, such dimensions are being given only for explanatory purposes, and should not be construed as limiting the scope of the invention. Further, although the embodiments depicted in the drawings show the seals 24 being equally spaced from each other, it is contemplated that the width between seals could be varied in any desired pattern, such as by having smaller spaces (such as ½ inch) alternating with larger spaces (such as 1 inch), or by having a series of two or more larger spaces interspersed with a single small space, or vice versa.

As shown in FIG. 1, the seals 24 are spaced apart from each other from one side 26 of the layers to the other side 28 of the layers, such that a series of gaps are formed between adjacent seals 24. As mentioned above, the gaps may be one-half inch in width, but other widths are also contemplated.

In the illustrated embodiment, reference numeral 12 identifies the bottom layer, reference number 14 identifies the layer immediately above layer 12, reference numerals 16 and 17 identify the next two layers immediately above layer 14 and reference numeral 18 identifies the top layer.

Thus, in this embodiment, the panel 10 as formed includes a series of elongated tubes 30, 32, 34, 36, . . . 40 defined between adjacent seals 24. Although many tubes are formed, only five such tubes are provided with reference numerals for ease of explanation. More specifically, each tube (30, 32, 34, 36, . . . 40, etc.) is created between adjacent seals 24 (on the sides) and between adjacent (i.e., top and bottom) layers. As explained below, in the preferred embodiment, such tubes will be inflated with air or other gas (such as argon, carbon dioxide, xenon, and krypton), depending upon the intended use of the panel. For example, if the panel is intended to only provide cushioning properties, such as in packaging applications, air is the most likely choice for an inflation gas. On the other hand, if high insulation properties are desired, gases other than air should be considered.

The tubes may take on any desired shape in cross-section when inflated. Additionally, the shape of the tubes need not be uniform along their length, nor equilateral, nor the same in cross-section as among the various tubes. In the drawings, the inflated tubes of this embodiment are shown as being hexagonal in shape, with sharp corners. However, in actual practice, it has been found that in this embodiment, such corners are rounded, thereby forming a bi-convex shape, such as that of a double convex lens (such as the shape of tubes 30, 32 of FIG. 13). The manner of forming these tubes will now be explained.

When layers 12 and 14 are sealed together along their length, with lateral spaces or gaps between the seals, these two layers form the series of elongated, spaced apart tubes, such as tubes 30 and 32, which are illustrated as horizontally spaced apart, with the horizontal direction extending from side 26 to side 28. When layers 16 and 17 are intermittently heat sealed together along seals 24 (or otherwise adhered to each other), they also form a series of tubes, one of which is designated as tube 36. Tube 36 is illustrated as being aligned vertically above tube 32. When the panel 10 is formed, there is a vertically positioned gap between adjacent layers and thus a tube 34 is created which is offset laterally and offset vertically from the tube 32 and from the tube 36. Tube 36 is created by the intermittent seals 24 between layers 16 and 17. Having the tubes in one row offset laterally from the tubes in the adjacent vertical row is optional, although it does provide the benefit of less volume (and less height in a vertical direction) than non-offset rows which may be a benefit both when the panel is inflated and when the panel is collapsed or non-inflated.

Thus, each layer is preferably sealed not only to the layer above it, but also to the layer below it (except, of course, for the uppermost and lowermost layers). Thus, for purposes of an example, layer 14 may be intermittently sealed to both layers 12 and 16, where the intermittent seals 24 between layers 14 and 16 are illustrated as the common lines in the drawings, and/or the contact as between tubes 32 and 36.

In addition, for illustrative, non-limiting purposes, the panel is illustrated as being formed of 10 layers (i.e., 5 pairs of layers intermittently sealed together), thus creating five vertically oriented rows of tubes. In FIG. 1, one of the lowermost tubes is identified with numeral 30 and one of the uppermost tubes 40 is vertically aligned above tube 30.

In addition, solely for illustrative purposes, the panel is illustrated as having eight horizontally spaced apart tubes. Furthermore, since there may be rows of tubes offset from an adjacent row of tubes, there could be seven horizontally spaced apart tubes in the row in which tube 34 is located, i.e., the row immediately above the row in which tubes 30 and 32 are located. Thus, it may be considered that the rows of tubes are in a honeycomb configuration, with each tube having an open baffle cross-sectional configuration.

It should be appreciated and understood that although the panel 10 is illustrated in an expanded form in FIG. 1, in the un-expanded form, there would be essentially be no air or gas (or fluid) within the various tubes and, therefore, the panel would be essentially flat but for the thickness of the layers themselves and thus may be stored in a rolled up or otherwise un-inflated form. The width of the panel 10 between sides 26 and 28 may be selected based upon the potential intended use of the panel, or the panel may be cut to the desired width at the time of intended use. In addition, the panel may be in a rolled-up or un-inflated form, and cut to the desired length from front 20 to back 22, at the time of intended use, or may be pre-cut to the desired length.

The formation of the panel 10 as an insulation and/or cushioning panel will now be described. Preliminarily, it should be understood that each of the previously described layers 12, 14, 16, etc. may itself be a single ply film or a multi-ply film and uniformity as between layers 12, 14 in this regard is not required. For example, and for illustration only, a layer may be a multi-ply film with a total thickness of 0.0015 inch with a top polyethylene ply, an intermediate polyester ply with a reflective coating (e.g., aluminum), and a bottom polyethylene ply. The layers are intended to provide a gas barrier, with or without the reflective coating. Additionally, the layers are also intended to have some degree of flexibility so as to accommodate irregularly shaped products, i.e., a product may be "wrapped" or covered with a panel or panels in addition to the panel being used in a flat orientation. The flexibility of the layers also facilitates the ability of the panels to be rolled up and/or collapsed when not inflated.

The formation of the completed panel 10 will now be described. For illustrative purposes, the layers and the tubes may be thought of as having the front 20 and the rear 22, and two opposing sides 26, 28.

As best shown in FIGS. 3 and 4, the layers are sealed together at the rear 22 and, for illustrative purposes, this is identified by reference number 44. The layers are sealed together at the front 20 and, again for illustrative purposes, this is identified by reference number 46.

However, prior to sealing the front (or the rear) of the layers together, the individual tubes are filled, or substantially filled, with air, argon, or other gaseous, liquid or fluid material. There may be uses where the tubes should be completely filled and other uses where the tubes should only be substantially filled, depending upon the intended use of the panel and the desirability of some physical flexibility of the panel. When all the tubes are filled to their desired degree of inflation, the front of the tubes (or the rear of the tubes) are sealed as at 46 (or 44) as previously described.

As may be appreciated, each of the tubes is distinct and independent from all immediately adjacent tubes such that if any one tube is punctured or otherwise damaged, the integrity of the panel 10 is not compromised i.e., fluid/gas should not be lost from adjacent tubes. It is beneficial in sealing the front edge 20 as at 46 and the rear edge 22 as at 44 that there is no fluid communication between the tubes, i.e., each of the tubes is preferably independent and isolated from all other tubes.

Turning now to FIGS. 5 and 6, one example of a method for creating the multi-ply layer that is used to form the panel will be described. The method shown and described relates to forming the multi-ply layer with heat seals provided at seals 24. However, it is contemplated that one of ordinary skill in the art could adapt the method for creating other types of seals, such as adhesive seals, pressure seals, etc.

FIG. 5 is a schematic of a pair of rollers, including upper roller 70 and lower roller 72. As can be seen in FIG. 5, upper roller 70 includes a series of spaced projections 71, which extend around the full circumference of the roller. In this example, the upper roller 70 is heated, and thus the spaced projections 71 are used to form the heat seals 24 when two layers are feed between rollers 70 and 72. More specifically, FIG. 6 shows how feed roller 74 includes the raw material (i.e., a thin sheet) for an upper layer 114, and feed roller 76 includes the raw material (i.e., a thin sheet) for a lower layer 112, and roller 80 is a collection roller for collecting the multi-ply laminate 116. For example, feed rollers 74 and 76 may each include a roll of aluminum, polyester, polyethylene, or other thin layer (or multi-layer laminated film) intended to be used as one of the layers (12, 14, 16, 17, 18) of the panel.

In operation, each of the rollers 70, 72, 74, 76 and 80 rotates in the direction indicated by the arrows in FIG. 6. In particular, rollers 70 and 72 are rotated in opposite directions, whereby heated upper roller 70 provided localized heat, via projections 71 (FIG. 5), to bond layers 112 and 114 together by forming the elongated seals 24 (FIG. 1). The two-ply laminate 116 (formed of layers 112 and 114), is rolled upon collection roller 80. In one example, only rollers 72 and 80 are driven, with the other rollers being rotated by the force of the moving layer. However, as known in the art, any or all of the rollers can be driven and controlled for tension by various means such as clutches, air brakes, etc.

In order to add a third ply to the laminate, the two-ply laminate 116 that has been rolled upon collection roller 80 is moved to lower feed roller 76, while maintaining the single ply layer 114 on upper feed roller 74. During the second lamination step, rollers 70 and 72 are shifted one way in the horizontal direction (i.e., leftwards or rightwards in the x direction of FIG. 5) such that the projections 71 of roller 70 are aligned midway between the heat seals 24 of two-ply laminate 116. Accordingly, the heat seals of the next layer (layer 16 of FIG. 1) will be located midway between adjacent heat seals 24 of bonded layer 12/14. After the alignment of the rollers 70 and 72 is adjusted, the second lamination step is conducted, resulting in a three-ply laminate being collected on collection roller 80. If a fourth ply (such as layer 17 of FIG. 1) is desired, the rollers 70 and 72 are shifted back to their original position of the first lamination step, the rolled laminate from the collection roller is moved to roller 76, and a third lamination step is performed whereby the heat seals 24 are aligned above those between layers 12 and 14. Such a process is continued, including the necessary shifting of the rollers 70 and 72, until the desired number of layers is achieved.

Figure 6A:
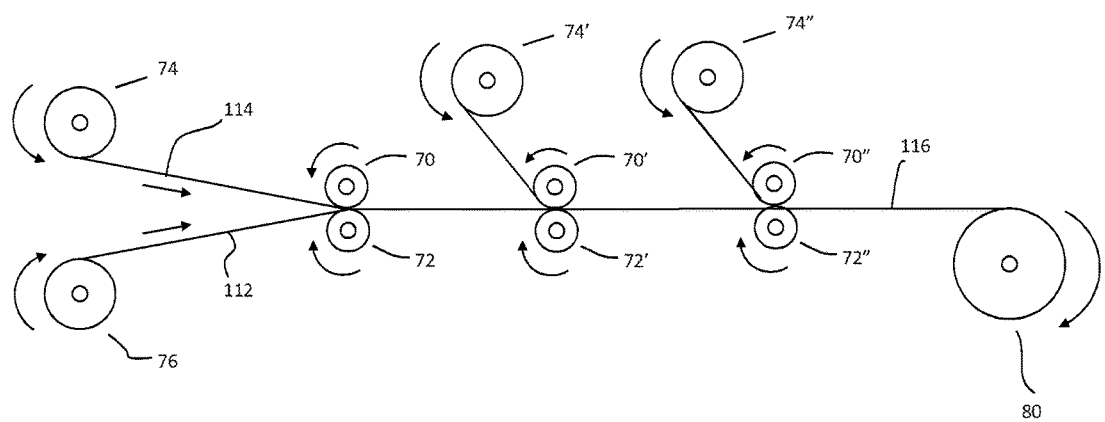
FIG. 6(A) is a schematic side view of a modified version of the process of FIG. 6.

Alternate methods of forming the laminate 116 are also contemplated. For example, FIG. 6(A) shows a modified version of the machine depicted in FIG. 6 whereby in the FIG. 6(A) version, a four-ply laminate 116 can be formed in a single pass. In particular, the machine of FIG. 6(A) adds additional feed rollers 74' and 74", as well as two additional upper/lower roller pairs 70'/72' and 70"/72". These additional rollers operate in essentially the same manner as rollers 74 and 70/72, and avoid the need to move the laminate from collection roller 80 to one of the feed rollers when additional plies are desired. Of course, more than four plies can be created through the use of one or more additional feed roller(s) 74 in combination with one or more additional roller pair(s) 70/72.

One of the features of the present method of manufacturing the laminate is that the temperature of roller 70, the rotational speed of the rollers 70/72, and the pressure applied between the rollers 70 and 72 must be carefully controlled to avoid having the projections 71 heat seal additional layers below the desired layers, especially when not using the heat barrier strips 58 (the method of using such strips is described below with reference to FIG. 11). In other words, referring briefly to FIG. 13, when creating heat seals 24' between layer 16 and layer 14, care must be taken to avoid sealing layer 14 to layer 12. Similarly, when creating the heat seals 24" between layer 17 and layer 16, care must be taken to avoid sealing layer 16 to layer 14. As just one example, Applicant has successfully created a laminate with ⅛ inch wide seals (without heat barrier strips) under the following conditions: having the heated roller 70 at a temperature of 285 degrees Fahrenheit, having the film travel at a speed of eight feet per minute through rollers 70/72, with a pressure between the rollers of 12.75 psi. Of course, these parameters can be varied as desired, and the specific values provided are by way of example only.

Once the laminate 116 is created (regardless of the number of layers therein), one open end (20 or 22) of the tubes (such as tubes 30, 32, 34, 36 and 40) can be sealed in areas 44 or 46, then the tubes can be inflated and finally the remaining open ends of the tubes can be sealed in either area 44 or 46, depending upon which area was sealed first (see FIGS. 1, 3 and 4). Areas 44 and 46 can be sealed in any desired manner (such as with heat, adhesive, pressure, folding, clips, etc.) as long as such seals prevent the air or other gas from escaping from the inflated tubes into the atmosphere as well as into other tubes. Various different methods of inflating and sealing the laminate 116 will be described hereinafter with reference to FIGS. 7(A), 7(B), 9(A)-9(F) and 10-12.

Turning now to FIG. 7(A), a schematic view of a first method of inflating and sealing the tubes of the laminate is shown. During the rolling process of creating the laminate 116 (FIG. 6), the side edges 26 and 28 of the laminate are sealed by heat seals (or other desired method) when creating the other elongated seals 24, as described above. After the laminate 116 is removed from the roll 80 (FIG. 6) and cut to the desired length, the front end 46 is sealed by a heat seal (or other desired method). Accordingly, three edges (edges 26, 28 and 46) of the laminate 116 are sealed at this point.

In the alternative, the seals at edges 26 and 28 could be omitted because each of the tubes is already sealed via seals 24.

Next, two additional sheets of material 88 are placed on the open end of the laminate 116, with one sheet being placed under the laminate and the other sheet being placed over the laminate. These additional sheets may be any desired material that can be heat sealed (or otherwise easily sealed in a hermetic manner, or non-hermetic manner, such as via an adhesive, via sonic welding, etc.), such as the materials used for the layers of the laminate (such as polyester, metalized polyester, polyethylene, metalized polypropylene, polypropylene, etc.). Sheets 88 (which will be referred to as "inflation tab(s)") are sealed to each other at their side edges 90, 92 in any known manner (such as heat seal or adhesive), and the additional sheets are also sealed to each other and to the laminate at their first end 94 to be attached to and surround the end 44' of the laminate 116, which still includes open, un-inflated tubes at this point.

An inflating device 100 with a nozzle 104 (for injecting air or other gas) is securely clamped (preferably via upper and lower gaskets, with upper gasket 103 being shown in FIG. 7(A)) to both sides of the unsealed edge 102 of the additional sheets 88 in manner that allows air (or other gas) to be pumped into the laminate through nozzle 104 (which is now positioned between additional sheets 88, and extends past the upper and lower gaskets in the area between the gaskets and the front of the multi-ply laminate) while preventing air from escaping along the edges adjacent the nozzle. The inflating device may be a modified version of a tabletop vacuum sealer (such as Gramatech Model No. GVS2100R), or any other device that can perform the desired functions described herein. The air, or other desired gas, is then pumped into the laminate to inflate the tubes to the desired pressure. For example, the tubes could be inflated to between about 1 and about 10 psi of pressure. Once the desired pressure is reached, a pair of heat seal bars 106 (with one bar being above the laminate and one bar below) seal the laminate 116, and the excess laminate between the heat seal bars 106 and the sheets 88 is cut away, resulting in a finished panel 10. Optionally, for certain applications, such as if an envelope is to be created, the excess laminate may be retained on the panel, for use as a foldable flap. Also, with regard to the upper and lower heat seal bars 106, both bars can be heated, or only one of the bars could be heated, if desired. Alternatively, depending on the materials of the sheets, the upper and lower heat seal bars could be heated to different temperatures, especially if the material of the sheet adjacent the upper bar is different from that adjacent to the lower bar.

FIG. 7(B) shows a modified example of the laminate 116 in combination with the additional sheets 88 (which could also be referred to as "inflation tab(s)"). In the FIG. 7(B) embodiment, the additional sheets 88 are essentially the same width as the laminate 116 (whereas in the FIG. 7(A) embodiment, the additional sheets 88 are wider than the width of the laminate 116). In this embodiment, seals 84 and 86 connect sheets 88 to each other at the side edges 92, 90, respectively, in any known manner (such as heat seal, adhesive, etc.). As explained below, one or more seals 96 connect the sheets 88 to the laminate near first end 94 of the sheets, and the one or more seals 96 surround the end 44' of the laminate, which still includes open, un-inflated tubes at this point in the process.

As an alternative to using a pair of sheets 88 as the inflation tab(s), it is also contemplated that a pre-formed "sleeve" (which is open at both ends) could be used as an inflation tab in any of the embodiments.

One of the important features of the present process of making inflatable panels involves the manner in which the sheets 88 (inflation tab(s)) are attached to the laminate 116. Experimentation has shown that using heat to attached sheets 88 to the laminate 116 is a very efficient way of accomplishing this task. It is very important that the sheets 88 (inflation tabs) are attached securely to the outermost layers of the laminate 116, but it is also important that the tabs are attached in such a way as to NOT close-up the tubes located above/below the tabs.

Following is a brief description of the steps of a preferred method of attaching the inflation tabs (sheets 88) to the laminate 116 in which one tab is attached to one side of the laminate, and then the same method is repeated for attaching the opposite tab to the opposite side of the laminate. A more detailed description of this process is provided with reference to FIGS. 8(a)-8(h). The steps of this process include:

(1) Preheating the tab sheet in the area that will attach to the laminate (which is an important step because it brings the tab material to a temperature at which it will heat seal to the laminate, however it should be noted that this step does not involve heating the laminate, it only involves heating the tab material). This step is preferably accomplished by pressing the tab material against a heated bar for a specified amount of time, but other methods of heating the tab material are also contemplated.

(2) Positioning the laminate above the preheated tab material, but not yet in contact with the tab material.

(3) Pressing the laminate down with an opposing bar (i.e., a bar opposing the heated bar) onto the pre-heated tab material, and against a heated bar for a specified amount of time (dwell time) at a specified pressure. The opposing pressure bar is preferably covered in rubber, or other elastomeric material, to protect the laminate.

The following table shows one example of variables used in the process for attaching the tabs to the laminate, but of course other values for the variables are also contemplated:

| Tab Sheet Material | Heat Bar Temperature (degrees F.) | Pre Heat Time (seconds) | Pressure Bar Force (psi) | Dwell Time (seconds) |
|---|---|---|---|---|
| .003" thick Nylon/Polyethyene structure | 345 | 3 | 16.32 | 0.75 |

Using different materials for the tab sheets and/or having sheets of different thicknesses than the 0.003 inch thickness provided above could require different values for the parameters than those provided in the table above. For example, it is contemplated that the heat bar(s) could be set within the range of 250-450° F.; the preheat time range could be set to be between 1 and 10 seconds, or more; the pressure bar force could be set to be within the range of 10 to 60 psi, and the dwell time range could be set to be between 0.2 and 1.5 seconds.

Turning now to FIGS. 8(A) through 8(H), a more detailed description of the process of attaching the sheets 88 (inflation tab) to the laminate will now be discussed. It is important that the sheets 88 be attached to the outermost layers of the laminate (layers 12, 18 of FIG. 1) with a bond that is strong enough to facilitate the inflation of a panel, but in a way that does not seal (i.e. close or shut) any of the tubes of a panel. One preferred method of attaching sheets 88 to the laminate 116 is with a heat seal.

Figure 8B:
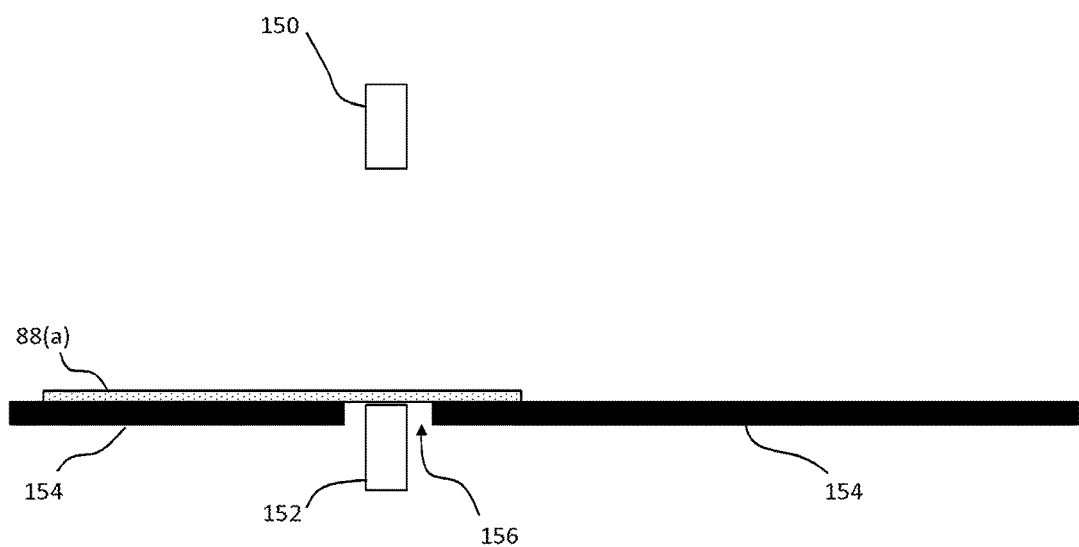
Figure 8C:
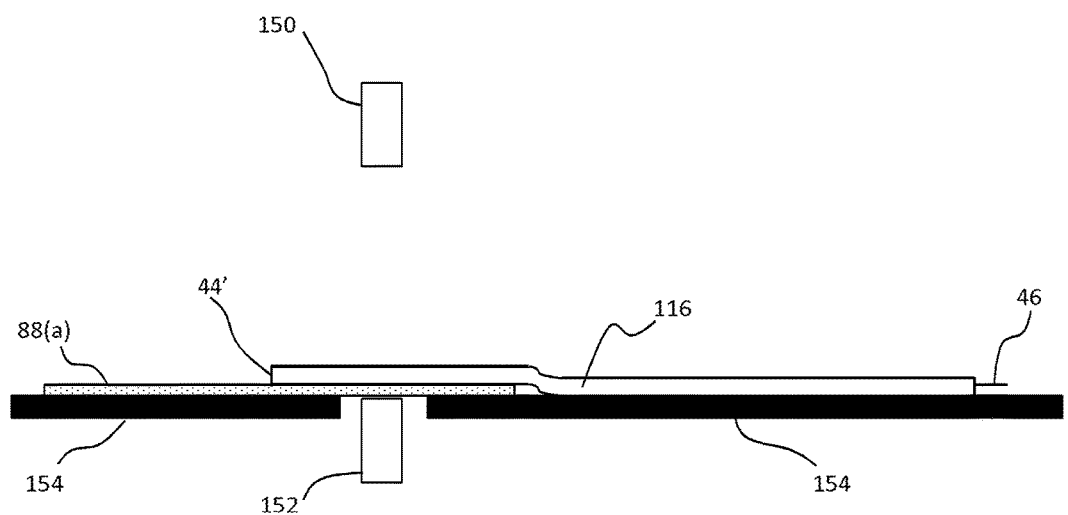

FIGS. 8(A)-8(H) are schematic side views showing the components of a machine that can be used to accomplish the process of attaching the laminate 116 to sheets 88. As can be seen in this figure, a single sheet 88(a) is placed on a platform 154 of the machine. The machine also includes a heat bar 152 and a compression bar 150, and there is a gap 156 in the platform 154. Sheet 88(a) is placed on the platform so that at least part of the sheet covers the gap 156. Next, as shown in FIG. 8(B), the heat bar 152 is moved within gap 156 so that it makes contact with, and begins to preheat, the sheet 88(a) for a specified amount of time. Next, as shown in FIG. 8(C), after the specified preheat time, a laminate 116 is placed on the platform 154 so that its sealed end 46 is located on the opposite side from the heat bar 152, and the open end 44' of the laminate is superposed upon the sheet 88(a), so that it is close to and above the heat bar 152.

Figure 8D:
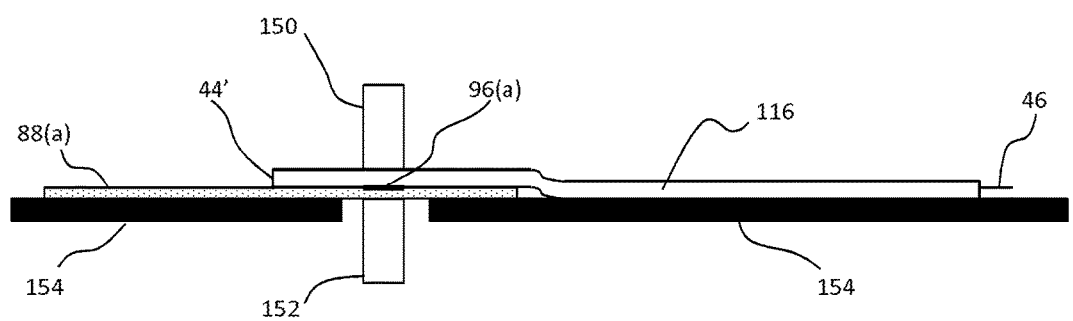
Figure 8G:
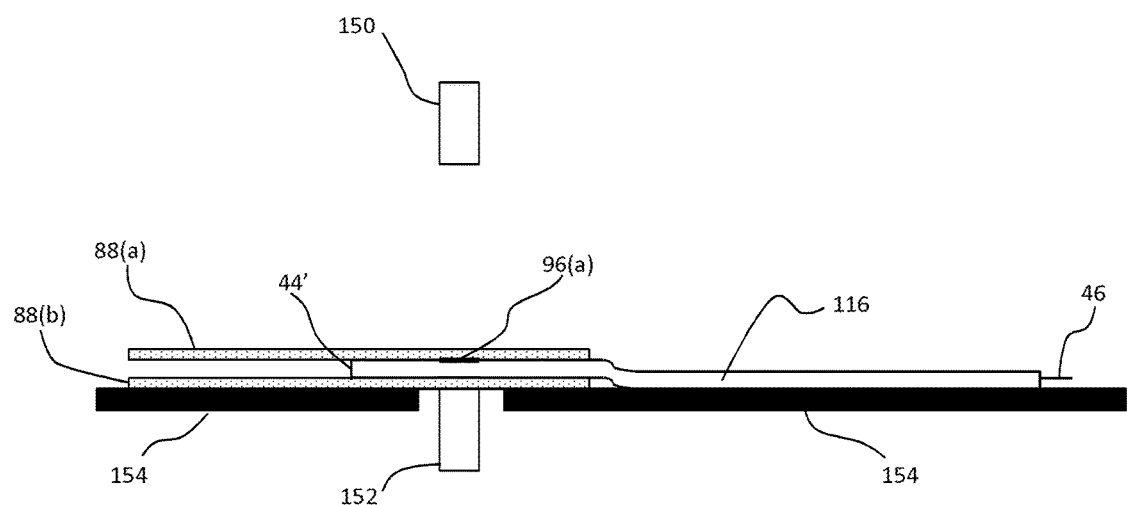
Figure 8H:
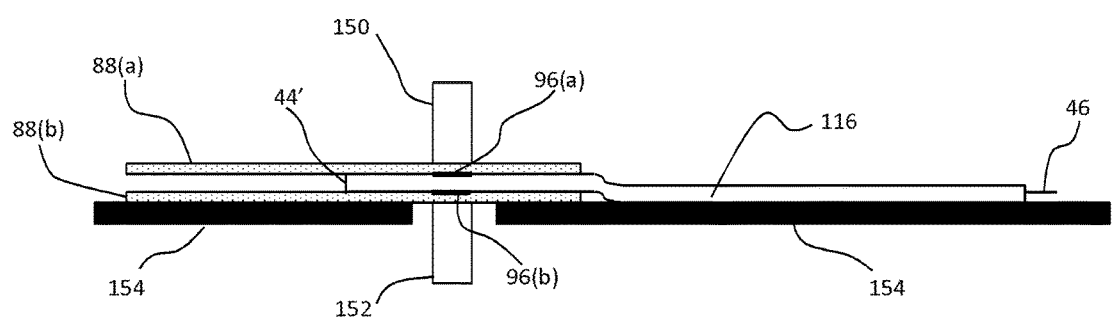

Next, as shown in FIG. 8(D), the compression bar 150 presses against the laminate 116 to create a seal 96(a) between the laminate and the sheet 88(a). Next, as shown in FIG. 8(E), a second sheet 88(b) is placed on the platform 154 of the machine in a similar fashion as discussed above (where laminate 116, with sheet 88(a) attached thereto, has already been removed from the machine and set aside). Next, as shown in FIG. 8(F), the heat bar 152 is moved so that it makes contact with, and begins to preheat, the sheet 88(b) for a specified amount of time. Next, as shown in FIG. 8(G), the laminate 116 (which at this point in the process already has a sheet 88(a) attached thereto) is placed on the platform 154 so that its sealed end 46 is on the opposite side from the heat bar 152, and the open end 44' of the laminate is adjacent to the sheet 88(b) and above the heat bar 152. Lastly, as shown in FIG. 8(H), the compression bar 150 presses against the sheet 88(a) and the laminate 116 to create seal 96(b) between the laminate 116 and the sheet 88(b). The resulting laminate 116, with sheets 88(a) and 88(b) attached thereto, could be similar to that depicted in FIG. 7(B). After sheets 88 are sealed to each other at their side edges 90, 92 in any known manner (such as heat seal or adhesive), this structure will be ready to be inflated and to have the ends of the tubes sealed.

Of course, as mentioned earlier, the sheets 88 (inflation tabs) can be attached through other means such as with adhesive, sonic welding, RF welding or any other desired means, as long as the bonds between the tab and the laminate are capable of withstanding the pressure of the inflation process, but without sealing the tubes closed between the tab (sheets 88).

Figure 9A:
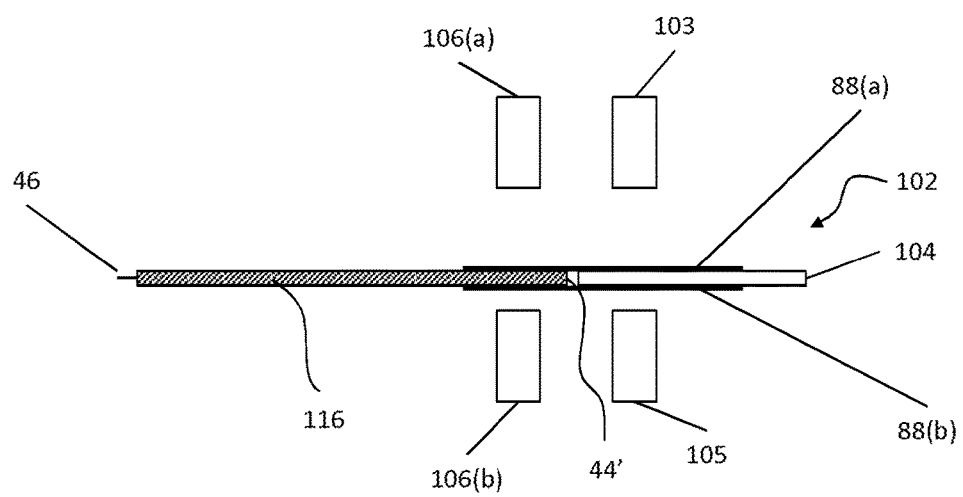

It should be noted that the process described above involves significant manipulation by hand. For higher volume applications, it is anticipated that the process could be automated through the use of sheet fed equipment, rotary type sealers, and/or other automation equipment known in the flexible packaging industry. Now turning to FIGS. 9(A)-9(F), a method of inflating and sealing of the panels will now be discussed. FIGS. 9(A)-9(F) are schematic side views of a machine that can be used for the inflating and sealing processes. As shown in FIG. 9(A), an uninflated panel 116 is positioned in an inflating device so that sheet 88(a) is above a nozzle 104, and sheet 88(b) is below the nozzle 104. In addition, the unsealed, open edge 102 of the tabs 88(a), 88(b), which are attached to the unsealed edge 44' of the laminate 116, should extend beyond upper and lower gaskets (103 and 105, respectively). Also the unsealed edge 44' of the laminate should be positioned laterally between the gaskets 103/105 and the upper and lower heat bars 106(a)/106(b).

Figure 9C:
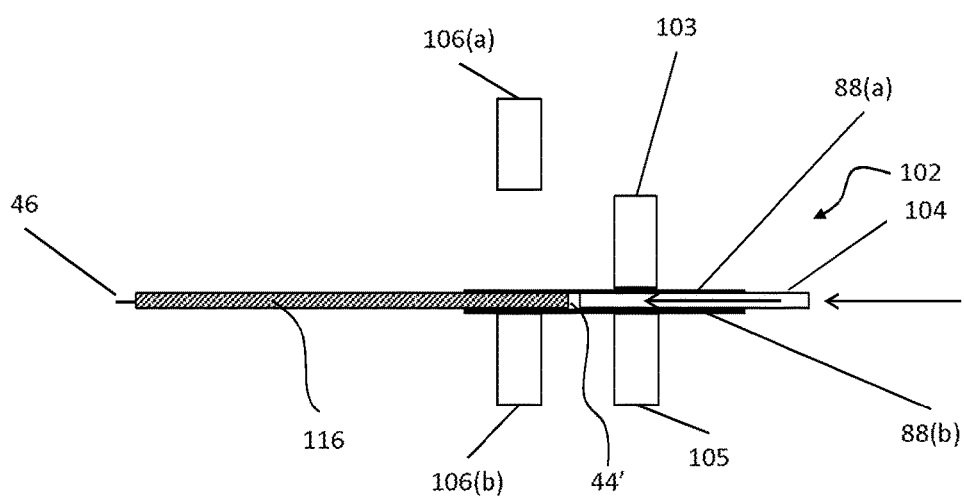
Figure 9D:
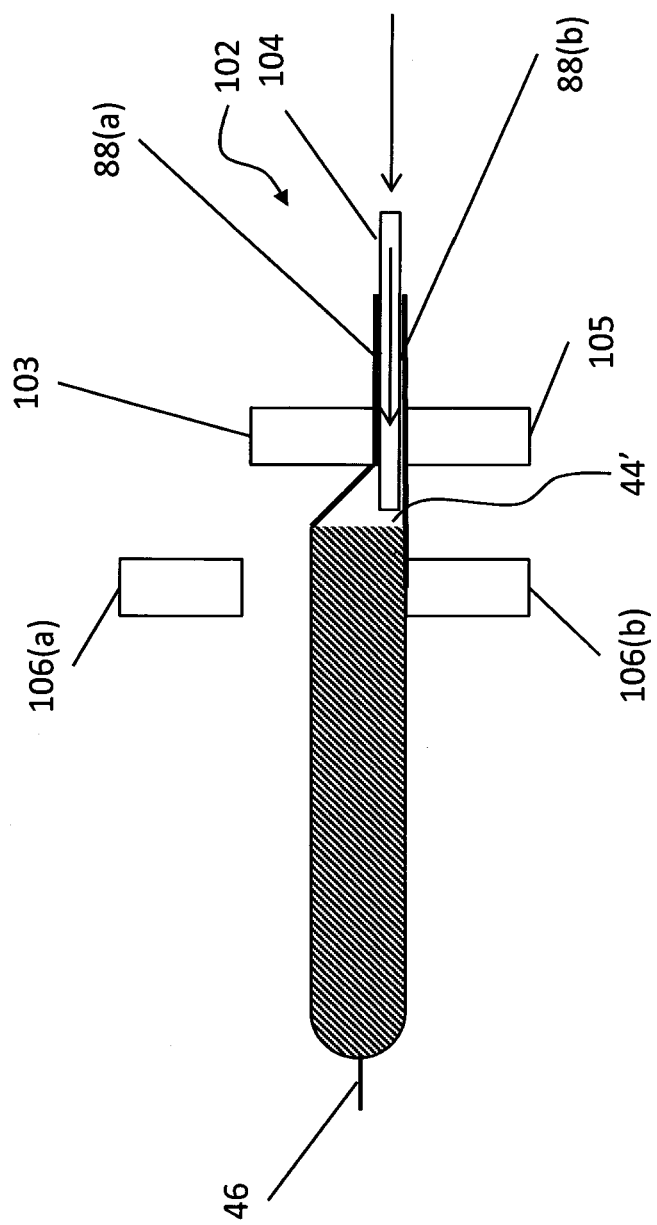

Next, as shown in FIG. 9(B), the gaskets 103 and 105 are clamped to both sheets 88(a) and 88(b) and around the nozzle 104 to form an air-tight seal around the sheets 88(a), 88(b) and nozzle 104 (i.e., thereby forming a temporary seal). Next, as shown in FIG. 9(C), air (or any other desired gas) is pumped into the tubes of the laminate 116 through the nozzle 104. The direction of the gas flow is depicted by the arrows. Since the unsealed edge 102 is sealed off from the atmosphere by the gaskets 103 and 105, the gas follows the path of least resistance, and inflates the panel to the condition shown in FIG. 9(D).

Figure 9E:
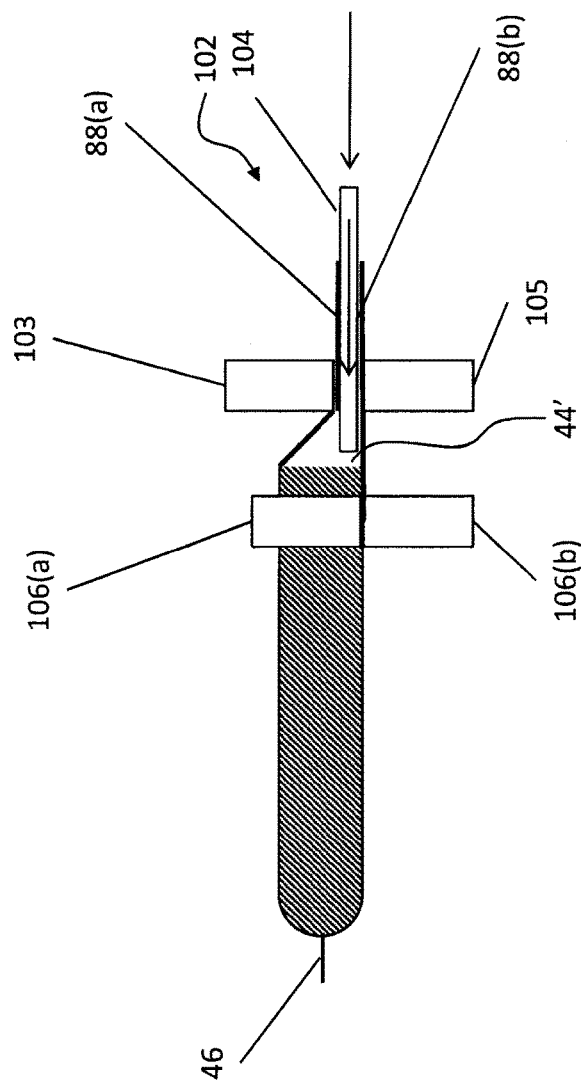
Figure 9F:
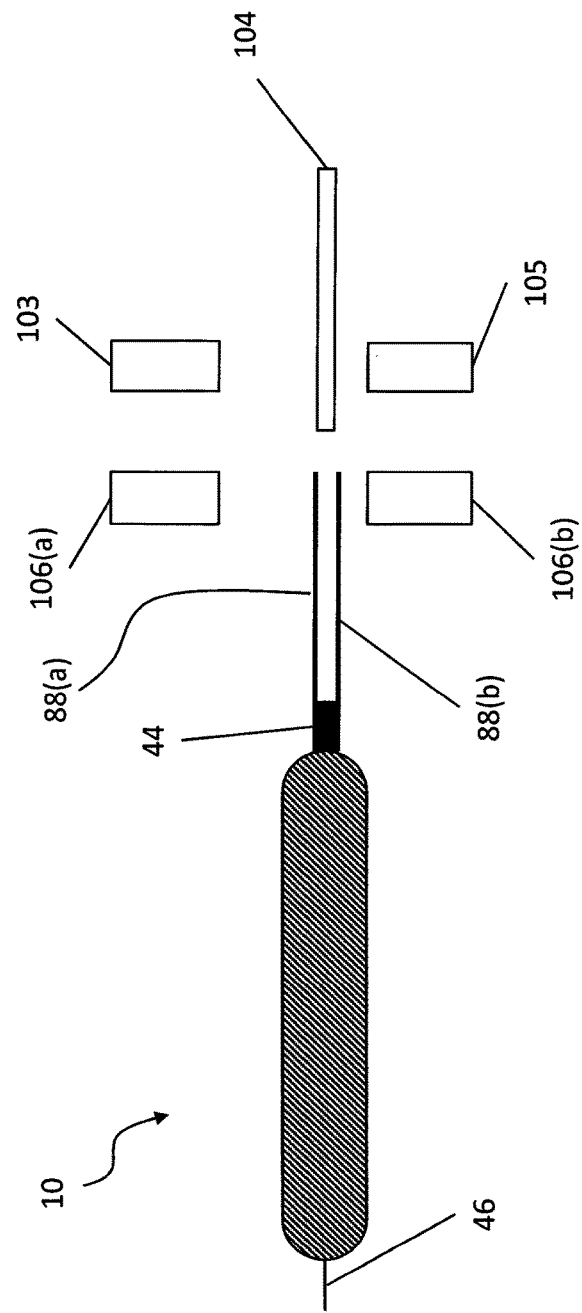

Next, as shown in FIG. 9(E), the heat seal bars 106(a) and 106(b) are pressed against each other with the laminate between them, thereby creating a seal (shown as numeral 44 in FIG. 9(F)) through all layers of the panel. Finally, as shown in FIG. 9(F), the heat seal bars 106(a) and 106(b), and the gaskets 103 and 104 are separated from each other (i.e., the heat seal bars and the gaskets are moved back into their original positions of FIG. 9(A)), thereby releasing an inflated and sealed panel 10.

Figure 10:
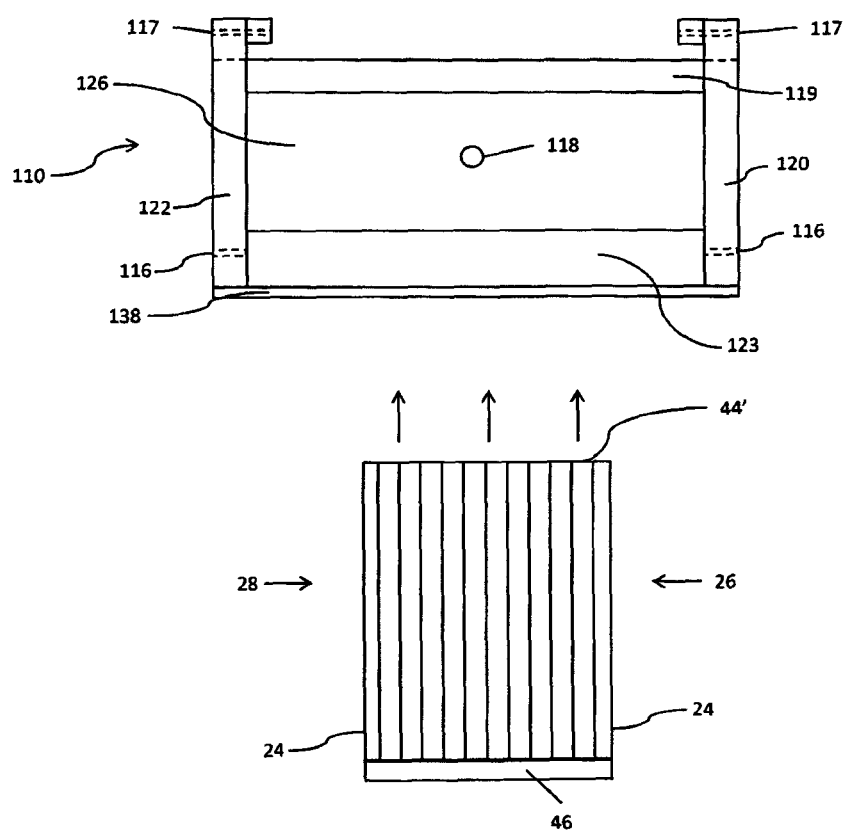
FIG. 10 is a schematic top view of another method and machine for inflating the tubes of the panel.
Figure 11:
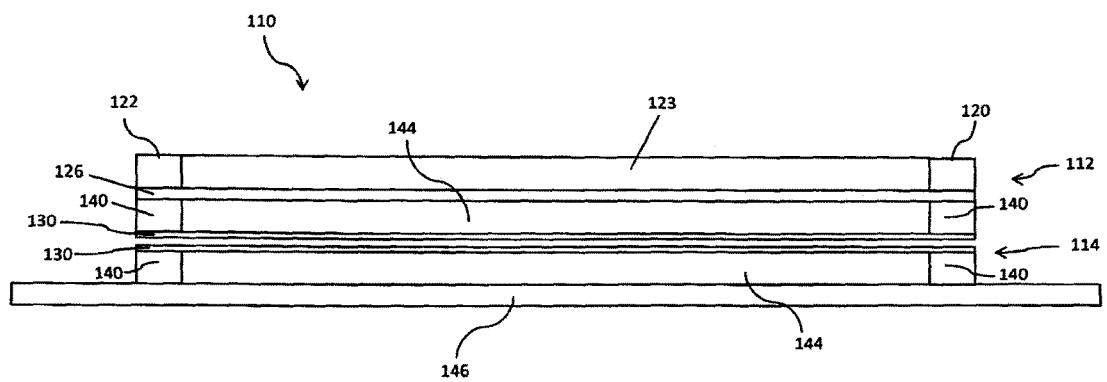
FIG. 11 is a schematic front view of a portion of the machine of FIG. 10.
Figure 12:
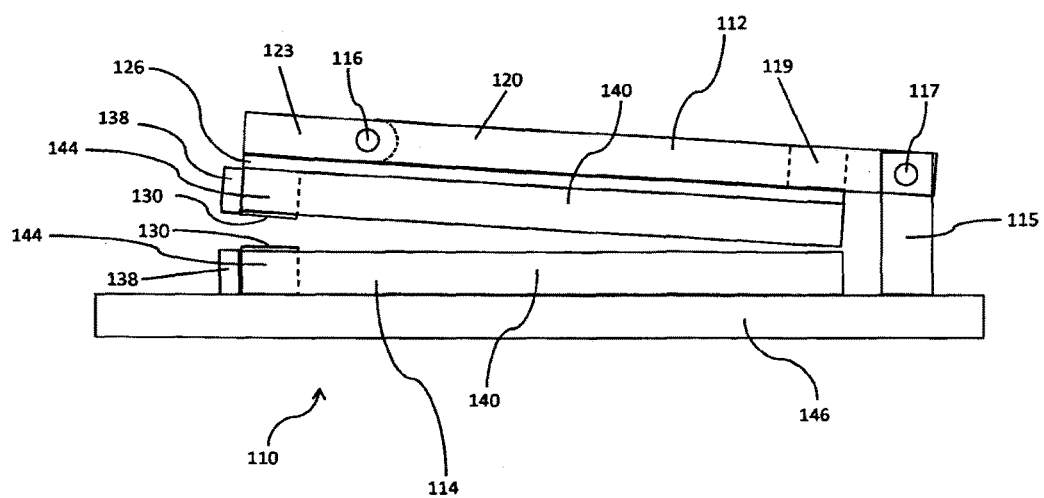
FIG. 12 is a schematic side view of the machine of FIG. 10.

Turning now to FIGS. 10-12, schematic drawings of a clam-shell type of inflating and sealing machine 110 is shown, with FIG. 10 showing a schematic top view of machine 110, FIG. 11 showing a schematic front view of machine 110 (with the heat seal bars 106 removed for ease of explanation), and FIG. 12 showing a side schematic view. The method and machine of FIGS. 10-12 are an alternative to the methods and machines of FIGS. 7 and 8. With machine 110, as with the other machines, panels 10 of any desired length can easily be created. Additionally, machines 110, and some of the other machines, can be relatively portable, and thus have the additional benefit of being capable of being used on-site, such as at a construction site or at any permanent or temporary packaging facility, to create panels of the desired lengths. Further, the methods of using machine 110 or the other machines, are relatively simple, and thus the machine can easily be used with relatively minimal training.

FIG. 10 shows the laminate about to be inserted into machine 110. In this method, as with the method using device 100, the laminate is sealed on three sides. More specifically, side edges 26 and 28 of the laminate are sealed by heat seals (or other desired method) at seals 24 during manufacture of the laminate, as described above. After the laminate is removed from the roll and cut to the desired length, the front end 46 is sealed by a heat seal (or other desired method). Accordingly, three edges (edges 26, 28 and 46) are sealed at this point.

The machine 110 is configured as a clam-shell design, with two structures (an upper structure 112 and a lower structure 114) being connected to each other via a joining structure that includes a hinge 117. The upper structure 112 includes a flexible bladder 126, which is made of any desired elastomeric material of low gas permeability. There is a gas insertion port, such as port 118, for providing air or other gas to a hollow interior defined between the upper and lower structures, as described below.

As can be seen in FIG. 10, the upper structure is composed of a back frame member 119, frame side members 120 and 122, and a front frame bar 123. As can be determined by viewing FIGS. 10 and 12, the front frame bar 123 is hinged with respect to frame side members 120 and 122 at hinges 117. Accordingly, front frame bar 123 is configured for limited rotational movement with respect to frame side members 120 and 122. The bladder 126 is sealed on three sides thereof with respect to frame side members 120 and 122 and frame back member 119. Preferably, the bladder 126 is not sealed with respect to front frame bar 123. The lower structure 114 includes a bottom wall 146, as can be seen in FIGS. 11 and 12. The joining structure includes a pair of members 115 that are rigidly attached to bottom wall 146, and are configured for hinges 117, for attaching the upper structure 112 to the lower structure 114.

When the upper structure 112 is closed upon the lower structure 114, the hollow interior therebetween is sealed, such as via mating gaskets 140 at the sides. Mating gaskets are also provided below the frame back member 119. The manner in which front portion is sealed will be described below. Finally, the outside edge of the front portion 123 also includes a pair of heat seal bars 138 (i.e., an upper bar associated with the upper structure 112 and a lower bar associated with the lower structure 114).

Turning now to FIG. 11, this figure shows a schematic front view of upper frame member 112 and lower frame member 114. The upper structure includes the hinged front frame bar 123, the bladder 126, a compressible strip 144, and an adhesive layer 130. The front frame bar 123 may be made of any desired rigid material, such as rigid plastic, or of a metal, such as aluminum, or other lightweight material. The compressible strip 144 is made of any compressible foam or rubber, such as polyethylene, polyurethane, silicone, neoprene, or other flexible compressible material. The adhesive layer 130 is also only a thin strip made of tape or adhesive material, which will be described in more detail below.

The lower structure 114 includes the bottom wall 146, a compressible strip 144 and an adhesive layer 130. The lower compressible strip and the lower adhesive layer are similar to the upper compressible strip and the upper adhesive layer, respectively. In selecting the adhesive layer 130, care should be taken to provide a layer which can provide a seal at the front edge of the machine (in areas with the laminate inserted therein and without such laminate), but that is not so strong that the laminate cannot be removed therefrom. Further, it is also desirable that such adhesive maintains it sealing and adhesive properties for multiple iterations of use of the machine. The present inventor has found that one example of such an adhesive is a tape known as "3M restickable film" which is manufactured by the 3M Corporation, and sold as part number 44004639660. Additionally, it is also contemplated that other types of adhesives and/or tapes could also be utilized. Two examples of such tapes, which are currently under development, are a class of tapes known as "gecko" tapes, as well as tapes in which the adhesive properties can be activated or de-activated with the use of electricity. Any known, or later developed, tape or adhesive in which the adhesive properties can be activated or de-activated at will could be used as adhesive 130.

In use, the front of the clam-shell type of machine 110 is opened (via hinge 117) and the laminate is inserted into the front of the machine, in the direction indicated by the arrows in FIG. 10. The front edge 44' of the laminate should be inserted past the front portion of the machine (i.e., past the mating adhesives 130 and the mating compressible strips 144). The front of the machine is then closed tightly by applying pressure to frame sides 120 and 122, as well as to front frame bar 123. After a sufficient time has elapsed for the adhesive layers 130 to adhere to the upper and lower surfaces of the laminate (as well as to the opposite adhesive layer in areas lacking the laminate), the pressure on the front frame bar 123 is removed, which allows for a slight separation between the uppermost layer 18 (FIG. 1) of the laminate and the lowermost layer 12 (FIG. 1), such that the tubes can be inflated (such as tubes 30, 32, 34, 36, ... 40 of FIG. 1).

Next, the port 118 is utilized to pump air, or another gas, into the hollow interior of the machine 110, which gas then passes into the tubes of the laminate to inflate them. It should be noted that since the laminate is hermetically sealed to the front of the machine (via the adhesive), any gas within the hollow interior of the machine does not escape into the atmosphere, but instead passes into the tubes of the laminate.

Once the tubes reach the desired amount of inflation, the pair of heat seal bars 138 are utilized to close the fourth edge of the laminate. Finally, any excess laminate is cut away, resulting in a finished panel 10. Optionally, for certain applications, such as if an envelope is to be created, the excess laminate may be retained on the panel, for use as a foldable flap.

Although numerous different configurations of the panel are contemplated as being within the scope of the invention, Applicant has conducted numerical simulations of the properties of certain embodiments of the panels, the results of which are depicted below in the following table:

| Infection Gas | Hexagons Tall | Height (thickness) of panel | Thermal conductivity (w/m-c) | R value (per inch thickness) |
| --- | --- | --- | --- | --- |
| Air | 3 | .974 inches | 0.029 | 4.97 |
| Air | 7 | 2.273 inches | 0.0254 | 5.67 |
| Argon | 3 | .974 inches | 0.022 | 6.55 | in the table above, the heat seals were each ⅛ inch wide, and the space between seals was ½ inch. Additionally, the following structure was used for each of the layers of the laminate: a 0.00036 inch thick metalized polyester layer was sandwiched between two 0.0006 inch thick layers of polyethylene via 0.00022 thick adhesive layers, resulting in a total film thickness for each layer of 0.002 inches. Further, in the table above, the designation "hexagons tall" refers to the maximum number of stacked hexagons. For example, FIG. 1 shows a panel that is 5 hexagons tall. As can be seen from the table above, relatively high R values and relatively low thermal conductivity can be achieved with panels made as described herein.

Figure 13:
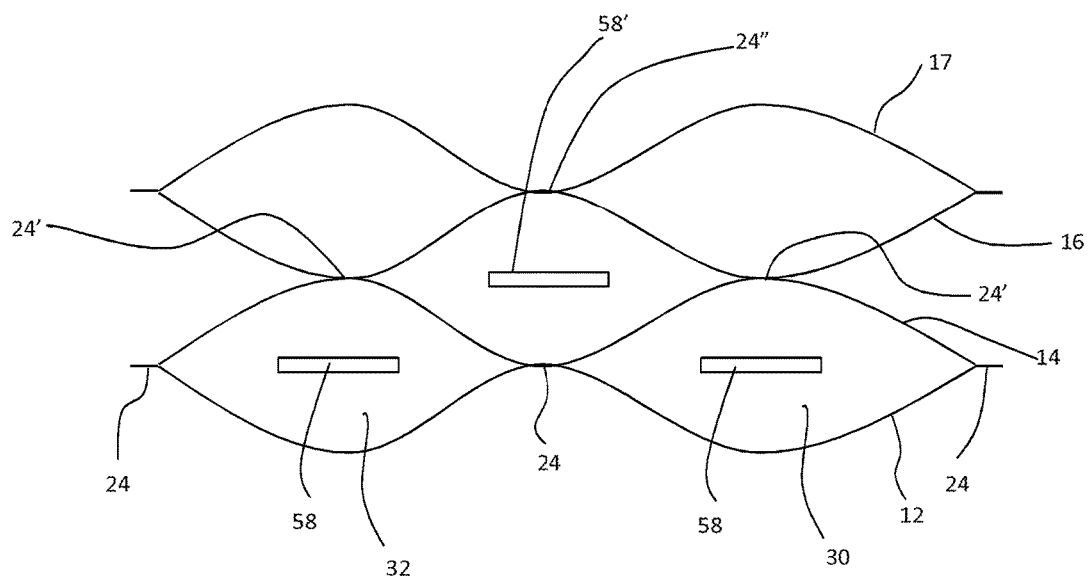
FIG. 13 is partial front view of another embodiment of a procedure for making the panel.

Turning now to FIG. 13, a modification of the method of forming the laminate will be described. In this method, a plurality of strips 58 of a material with heat barrier properties, such as strips made of polytetrafluoroethylene (PTFE), which is commonly sold under the brand name Teflon®, are provided between the layers at spaced intervals. Preferably, such strips 58 are provided in the appropriate positions between layers during a process similar to that described with reference to FIGS. 5 and 6. However, during such a modified process, one feed roll is provided for each layer of the laminate, and the full multi-layer laminate results from a single iteration of the rolling process (i.e., without the need to build the laminate layer by layer by moving a multi-layer laminate to the feed roll for multiple iterations). Further, the thin films of laminate move past the strips 58, so such strips are not maintained in the resulting multi-ply laminate.

Such strips 58 are believed to be useful in situations where seals 24 are heat seals in order to prevent the heat from the sealing bar, or other heating apparatus, from sealing more than a single layer at a time. For example, in an initial heat sealing step, a plurality of spaced heat seal bars are pressed upon stacked layers 12 and 14 to form seals 24. Next, layer 16 is placed upon multi-ply layer 12/14, and the heat seal bars form seals 24'. The inclusion of heat barrier strips 58 minimize the amount of heat travelling below seals 24', thereby preventing an additional heat seal from being created below each seal 24', which would reduce the width of tubes 30, 32, etc. from their desired width to one half of the desired width. Likewise, when forming the heat seals 24" (only one of which is shown) between layers 16 and 17, after layer 17 is stacked upon the multi-ply layer 12/14/16, heat barrier strip 58' minimizes the amount of heat travelling below seals 24", thereby preventing an additional heat seal from being created below each seal 24". Such operation is continued for each additional layer of the panel.

The foregoing is a complete description of the inflatable panel and various methods of making such a panel. It should be understood that the panel may be heat sealed and inflated as part of the manufacturing process or may be heat sealed and inflated "on location" after the panel has been cut to the desired size. Many changes and modifications may be made to the foregoing without departing from the spirit and scope encompassed by the foregoing description.

What is claimed is:

1. A method of making an inflatable panel comprising the steps of:
    superimposing a second layer of a material of low gas permeability upon a first layer of a material of low gas permeability;
    creating a plurality of first elongated seals by intermittently sealing together said first and second layers to create a laminate, thereby defining a plurality of first tubes between adjacent pairs of said first elongated seals;
    sealing rear ends of said first tubes;
    inflating said first tubes from front ends thereof with a gas; and
    sealing said front ends of said first tubes,
    whereby the gas within each of said tubes is prevented from flowing between said first tubes, and
    wherein the method further comprises:
        providing an inflation tab, wherein said inflation tab defines a pair of sides extending between first and second ends, and wherein said first and second ends are open; and
        attaching said inflation tab to an area in the vicinity of said front end of said tubes of the laminate such that interior portions of said first end of said inflation tab are attached to exterior portions of said laminate, whereby the gas applied during said inflating step passes though said inflation tab prior to reaching the laminate,
    wherein said attaching step is performed before said inflating step.

2. The method according to claim 1, further comprising:
    superposing a third layer of a material of low gas permeability upon said second layer;
    creating a plurality of second elongated seals by intermittently sealing together said second and third layers, thereby defining a plurality of second tubes between adjacent pairs of said second elongated seals;
    sealing rear ends of said second tubes;
    inflating said second tubes from front ends thereof with a gas; and
    sealing said front ends of said second tubes,
    whereby the gas within each of said tubes is prevented from flowing between said second tubes, as well as between said first and said second tubes.

3. The method according to claim 2, wherein said first and second tubes are each of a generally bi-convex shape, when considered in cross-section.

4. The method according to claim 2, wherein at least one of said first and second elongated seals is created via heat sealing.

5. The method according to claim 2, wherein at least one of said first and second elongated seals is created via adhesive sealing.

6. The method according to claim 1, wherein the gas comprises air.

7. The method according to claim 1, wherein the gas is selected from the group consisting of argon, carbon dioxide, xenon and krypton.

8. The method according to claim 1, wherein said step of attaching said inflation tab to the laminate comprises:
    heating said inflation tab;
    positioning the laminate upon said inflation tab; and
    applying pressure to said laminate with said inflation tab positioned adjacent thereto to create a seal between said laminate and said inflation tab.

9. The method according to claim 1, wherein said inflation tab is comprised of two sheets connected together at said sides.

10. The method according to claim 1, wherein said inflation tab comprises a sleeve that is open at said first and second ends.

11. The method according to claim 1, wherein said step of inflating said first tubes comprises:
    inserting a nozzle into said second end of said inflation tab; and
    creating a temporary seal around said inflation tab such that gas exiting said nozzle flows through said inflation tab and into said first tubes, thereby inflating said first tubes.

12. The method according to claim 11, wherein said step of creating a temporary seal comprises clamping said inflation tab between upper and lower gaskets.

13. A method of making an inflatable panel comprising the steps of:
    providing a laminate, wherein said laminate comprises at least two sheets with a plurality of first tubes defined between adjacent ones of said sheets, and wherein said first tubes are open on at least a front end of said laminate;
    providing an inflation tab, wherein said inflation tab defines a pair of sides extending between first and second ends, and wherein said first and second ends are open; and
    attaching said inflation tab to an area in the vicinity of said front end of the laminate such that interior portions of said first end of said inflation tab are attached to exterior portions of said laminate.

14. The method according to claim 13, wherein said step of attaching said inflation tab to the laminate comprises:
    heating said inflation tab;
    positioning the laminate upon said inflation tab; and
    applying pressure to said laminate with said inflation tab positioned adjacent thereto to create a seal between said laminate and said inflation tab.

15. The method according to claim 13, wherein said inflation tab is comprised of two sheets connected together at said sides.

16. The method according to claim 13, wherein said inflation tab comprises a sleeve that is open at said first and second ends.

* * * * *